US009239246B2

(12) United States Patent    (10) Patent No.: US 9,239,246 B2
Jones    (45) Date of Patent: Jan. 19, 2016

(54) METHOD, SYSTEM, AND COMPUTER PROGRAM PRODUCT FOR VISUAL DISAMBIGUATION FOR DIRECTIONS QUERIES

(75) Inventor: Jonah Jones, Sydney (AU)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/276,787

(22) Filed: Oct. 19, 2011

(65) Prior Publication Data

US 2015/0177017 A1    Jun. 25, 2015

(51) Int. Cl.
*G01C 21/34* (2006.01)
*G08G 1/123* (2006.01)
*G01C 21/36* (2006.01)
*G01C 21/26* (2006.01)
*G01C 21/00* (2006.01)

(52) U.S. Cl.
CPC ........ *G01C 21/3682* (2013.01); *G01C 21/3676* (2013.01); *G01C 21/00* (2013.01); *G01C 21/26* (2013.01)

(58) Field of Classification Search
USPC .................. 701/527, 533, 428, 410, 420; 342/357.22, 357.25, 357.31; 340/990, 340/995.19; 348/116, E07
See application file for complete search history.

(56) References Cited

U.S. PATENT DOCUMENTS

| 5,243,528 | A | | 9/1993 | Lefebvre |
| 6,067,502 | A | * | 5/2000 | Hayashida et al. ........... 701/428 |
| 6,278,938 | B1 | | 8/2001 | Alumbaugh |
| 6,812,888 | B2 | | 11/2004 | Drury |
| 6,973,318 | B2 | | 12/2005 | Jambhekar et al. |
| 7,206,837 | B2 | | 4/2007 | Seligmann |
| 7,395,149 | B2 | * | 7/2008 | Matsumoto et al. .......... 701/414 |
| 7,444,237 | B2 | | 10/2008 | Dale |
| 7,783,421 | B2 | * | 8/2010 | Arai et al. .................... 701/420 |
| 7,822,491 | B2 | | 10/2010 | Howlett et al. |
| 7,840,579 | B2 | | 11/2010 | Samuelson |
| 7,865,306 | B2 | | 1/2011 | Mays |
| 7,937,394 | B2 | * | 5/2011 | Venkataraman et al. ..... 707/741 |
| 8,108,144 | B2 | | 1/2012 | Forstall et al. |
| 8,175,802 | B2 | | 5/2012 | Forstall et al. |
| 8,180,379 | B2 | | 5/2012 | Forstall et al. |

(Continued)

FOREIGN PATENT DOCUMENTS

JP    2005114695 A    4/2005
JP    2013134155 A  *  7/2013 ............. G01C 21/34

(Continued)

OTHER PUBLICATIONS

Integrated Google Maps and smooth street view videos for route planning; Chi Peng; Bing-Yu Chen; Chi-Hung Tsai Computer Symposium (ICS), 2010 International; Digital Object Identifier: 10.1109/COMPSYM.2010.5685494 Publication Year: 2010 , pp. 319-324.*

(Continued)

*Primary Examiner* — Cuong H Nguyen
(74) *Attorney, Agent, or Firm* — Dority & Manning, P.A.

(57) ABSTRACT

Systems, methods, computer programs, and user interfaces are provided to send a map search request including a start location and a search term to a map server, receive a number of routes, each of the routes describing a route from the start location to one of a number of potential destinations, receive a road style for rendering roads in a map extent encompassing the routes, and simultaneously display the routes based on a multiple route style.

27 Claims, 8 Drawing Sheets

(56) References Cited

U.S. PATENT DOCUMENTS

| | | | |
|---|---|---|---|
| 8,190,362 | B2 | 5/2012 | Barker et al. |
| 8,204,684 | B2 | 6/2012 | Forstall et al. |
| 8,213,389 | B2 | 7/2012 | Bush et al. |
| 8,260,320 | B2 | 9/2012 | Herz |
| 8,483,950 | B2* | 7/2013 | Okude et al. ................ 701/411 |
| 8,639,214 | B1* | 1/2014 | Fujisaki ...................... 455/406 |
| 8,676,273 | B1* | 3/2014 | Fujisaki ...................... 455/567 |
| 8,818,726 | B1* | 8/2014 | Jones ............... G01C 21/3676 701/527 |
| 9,057,620 | B2* | 6/2015 | Dave ................. G01C 21/3461 |
| 2003/0069683 | A1 | 4/2003 | Lapidot et al. |
| 2004/0158395 | A1* | 8/2004 | Yamada et al. ............. 701/202 |
| 2004/0218894 | A1 | 11/2004 | Harville et al. |
| 2007/0032949 | A1* | 2/2007 | Arai et al. ................... 701/211 |
| 2007/0078599 | A1* | 4/2007 | Yoshioka ............ G01C 21/367 701/454 |
| 2007/0106468 | A1 | 5/2007 | Eichenbaum et al. |
| 2008/0052638 | A1 | 2/2008 | Frank |
| 2008/0097731 | A1 | 4/2008 | Lanes et al. |
| 2008/0177462 | A1* | 7/2008 | Yoshioka et al. ............ 701/200 |
| 2008/0208462 | A1* | 8/2008 | Tanaka ......................... 701/209 |
| 2008/0300778 | A1 | 12/2008 | Kuznetsov |
| 2008/0312819 | A1 | 12/2008 | Banerjee |
| 2009/0048774 | A1* | 2/2009 | Yoshioka et al. ............ 701/202 |
| 2009/0140887 | A1* | 6/2009 | Breed et al. ................. 340/990 |
| 2009/0240431 | A1 | 9/2009 | Chau et al. |
| 2009/0276118 | A1 | 11/2009 | Shen et al. |
| 2009/0310325 | A1 | 12/2009 | Wong |
| 2009/0325607 | A1 | 12/2009 | Conway et al. |
| 2010/0017112 | A1 | 1/2010 | Sim |
| 2010/0057336 | A1 | 3/2010 | Levine |
| 2010/0082820 | A1 | 4/2010 | Furukawa |
| 2010/0125410 | A1 | 5/2010 | Hicks |
| 2010/0161370 | A1* | 6/2010 | Bloom ............................ 705/9 |
| 2010/0217513 | A1 | 8/2010 | Takeda |
| 2010/0250115 | A1* | 9/2010 | Ohata ................. G01C 21/367 701/533 |
| 2010/0305847 | A1 | 12/2010 | Gluck |
| 2010/0318285 | A1 | 12/2010 | Kim |
| 2010/0332132 | A1* | 12/2010 | Okude et al. ................ 701/210 |
| 2011/0010241 | A1 | 1/2011 | Mays |
| 2011/0022313 | A1 | 1/2011 | Bugnariu |
| 2011/0060523 | A1* | 3/2011 | Baron ........................... 701/224 |
| 2011/0087425 | A1 | 4/2011 | Deng et al. |
| 2011/0098920 | A1* | 4/2011 | Chuang et al. ............... 701/202 |
| 2011/0112717 | A1 | 5/2011 | Resner |
| 2011/0130950 | A1 | 6/2011 | Wexler et al. |
| 2011/0178697 | A1 | 7/2011 | Mincey et al. |
| 2011/0191017 | A1 | 8/2011 | Certin |
| 2012/0046861 | A1 | 2/2012 | Feldbauer |
| 2012/0053830 | A1 | 3/2012 | Bach |
| 2012/0173137 | A1* | 7/2012 | Compton et al. ............. 701/423 |
| 2012/0194530 | A1 | 8/2012 | Riach et al. |
| 2015/0142301 | A1* | 5/2015 | Dave ................. G01C 21/3461 701/423 |
| 2015/0260531 | A1* | 9/2015 | Ehsani .................... G01C 21/36 701/538 |

FOREIGN PATENT DOCUMENTS

| | | | | |
|---|---|---|---|---|
| JP | 2013253956 A | * | 12/2013 | ......... G01C 21/3469 |
| KR | 2010097238 A | | 9/2010 | |
| KR | DE 102012223760 A1 | * | 12/2013 | ......... G01C 21/3469 |
| WO | WO9204683 A | | 9/1992 | |
| WO | 2004114592 A1 | | 12/2004 | |
| WO | 2009046134 A1 | | 4/2009 | |

OTHER PUBLICATIONS

An expert system for tourists using Google Maps API; Pejic, A.; Pletl, S.; Pejic, B.; Intelligent Systems and Informatics, 2009. SISY '09. 7th International Symposium on; Digital Object Identifier: 10.1109/SISY.2009.5291141; Publication Year: 2009 , pp. 317-322.*

Integration of nomadic devices with automotive user interfaces; Gil-Castineira, F.; Chaves-Dieguez, D.; Gonzalez-castano, F.J. Consumer Electronics, IEEE Transactions on; vol. 55 , Issue: 1; Digital Object Identifier: 10.1109/TCE.2009.4814411 Publication Year: 2009 , pp. 34-41.*

IBM et al., "Method of Integrating Profile-Based Add-on Services for Generating Driving Directions," ip.com, Oct. 29, 2007.*

Zekeng, Liang. "The USHER System to Generate Semantic Personalised Maps for Travellers", 2010. pp. 49-71.*

Integrated Google Maps and smooth street view videos for route planning; Chi Peng; Bing-Yu Chen; Chi-Hung Tsai; Computer Symposium (ICS), 2010 International; Digital Object Identifier: 10.11 09/COMPSYM.201 0.5685494; Publication Year: 2010, pp. 319-324.*

Integrated Tourist Navigation System; Haomian Wang; Weiwei Cui; Hong Zhou; Yingcai Wu; Huamin Qu; Computer Graphics, Imaging and Visualization, 2009. CGIV '09. Sixth International Conference on; Digital Object Identifier: 10.1109/CGIV.2009.45 Publication Year: 2009 , pp. 497-502.*

Zekeng, Liang, "The USHER System to Generate Semantic Personalised Maps for Travellers", 2010, pp. 49-71.

Arikawa, Masatoshi, et al., "NAVITIME: Supporting Pedestrian Navigation in the Real World", IEEE, Jul.-Sep. 2007, pp. 21-29.

IBM et al., "Method of Integrating Profile-Based Add-on Services for Generating Driving Directions", ip.com, Oct. 29, 2007.

Integrated Tourist Navigation System; Haomian Wang; Weiwei Cui; Hong Zhou; Yingcai Wu; Huamin Qu; Computer Graphics, Imaging and Visualization, 2009. CGIV '09. Sixth International Conference on; Digital Object Identifier: 10.1109/CGIV.2009.45; Publication Year: 2009, pp. 497-502.

Nautical and aeronautical electronic charting/navigation systems developments, similarities and differences; Theunissen, E.; De Groot, C.A.; Sabelis, H.; Koeners, G.J.M.; Digital Avionics Systems Conference, 2004. DASC 04. The 23rd; vol. 1; Digital Object Identifier: 10.1109/DASC.2004.1391320; Pub. Year: 2004, pp. 4.C.1-41-12 vol. 1.

Ragghubir, et al., "Spatial Categorization and Time Perception: Why Does it Take Less time to Get Home?", Journal of Consumer Psychology, Aug. 30, 2010.

* cited by examiner

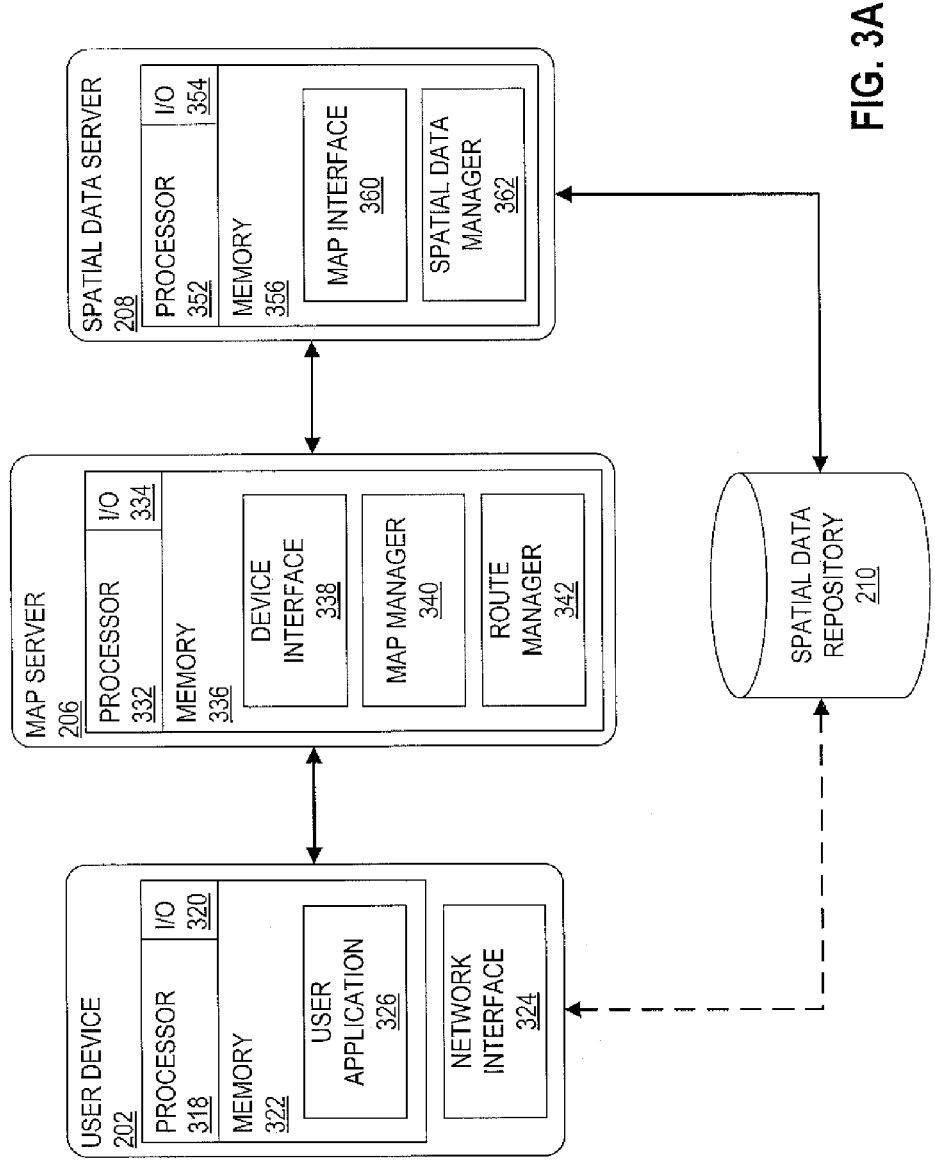

METHOD, SYSTEM, AND COMPUTER PROGRAM PRODUCT FOR VISUAL DISAMBIGUATION FOR DIRECTIONS QUERIES

TECHNICAL FIELD

The present disclosure relates to a process for visual disambiguation for directions queries. More specifically, embodiments of the present disclosure render multiple travel routes for a search term based on a multiple route style.

BACKGROUND

Modern smart phones and navigation devices are typically equipped with mapping capabilities. For example, a user of these devices may use the mapping capabilities to locate a point of interest or to plan for a trip. When searching for a point of interest, the user device typically presents a list of search results to the user. In addition, smart phone and navigation devices may be equipped with global positioning system (GPS) capabilities. In this case, GPS may be used on these devices to obtain maps of the geographic area at the device's location. Once located, the device may be used to navigate (by driving, using public transportation, walking, etc.) to a point of interest selected by the user. Specifically, the device may provide turn-by-turn directions and track the progress of the user in real-time by showing a current location of the user on a map.

A list of search results for a search term may lack information useful for selecting a point of interest from the search results. Turn-by-turn directions for the selected point of interest may not allow a user to select a different point of interest without returning to the list of search results.

SUMMARY

Various embodiments of systems, methods, computer programs, and user interfaces for visual disambiguation for directions queries are described herein. In some aspects, provided are a system, method, computer program, and user interface for sending a map search request including a start location and a search term to a map server, receiving a number of routes, each of the routes describing a route from the start location to one of a number of potential destinations, receiving a road style for rendering roads in a map extent encompassing the routes, and simultaneously displaying the routes based on a multiple route style.

In some aspects, the simultaneous display of the routes includes a start location label for the start location and an end location label for each of the potential destinations. In some aspects, the end location label for each of the potential destinations is rendered such that the end location label does not intersect road labels rendered based on the road style. In some aspects, the end location label is favored over the road labels such that intersecting road labels that cannot be repositioned to satisfy the multiple route style are not rendered.

In some aspects, the routes intersect one or more route roads, where the one or more route roads are rendered with an emphasized font based on the multiple route style, and where other roads are rendered with an understated font based on the road style.

In some aspects, the multiple route style is generated based on the routes and the road style.

In some aspects, each of the routes includes a travel time for the route from the start location to one of the potential destinations, where the travel time for each of the routes is rendered as a travel time label based on the multiple route style.

In some aspects, the system, method, computer program, and user interface are further for receiving a user selection of a selected route of the routes and generating a route map for the selected route, the route map being displayed in a navigation display of a user device.

BRIEF DESCRIPTION OF THE DRAWINGS

FIGS. 2 and 3A-3D show diagrams of systems in accordance with one or more embodiments.

Figure 1:
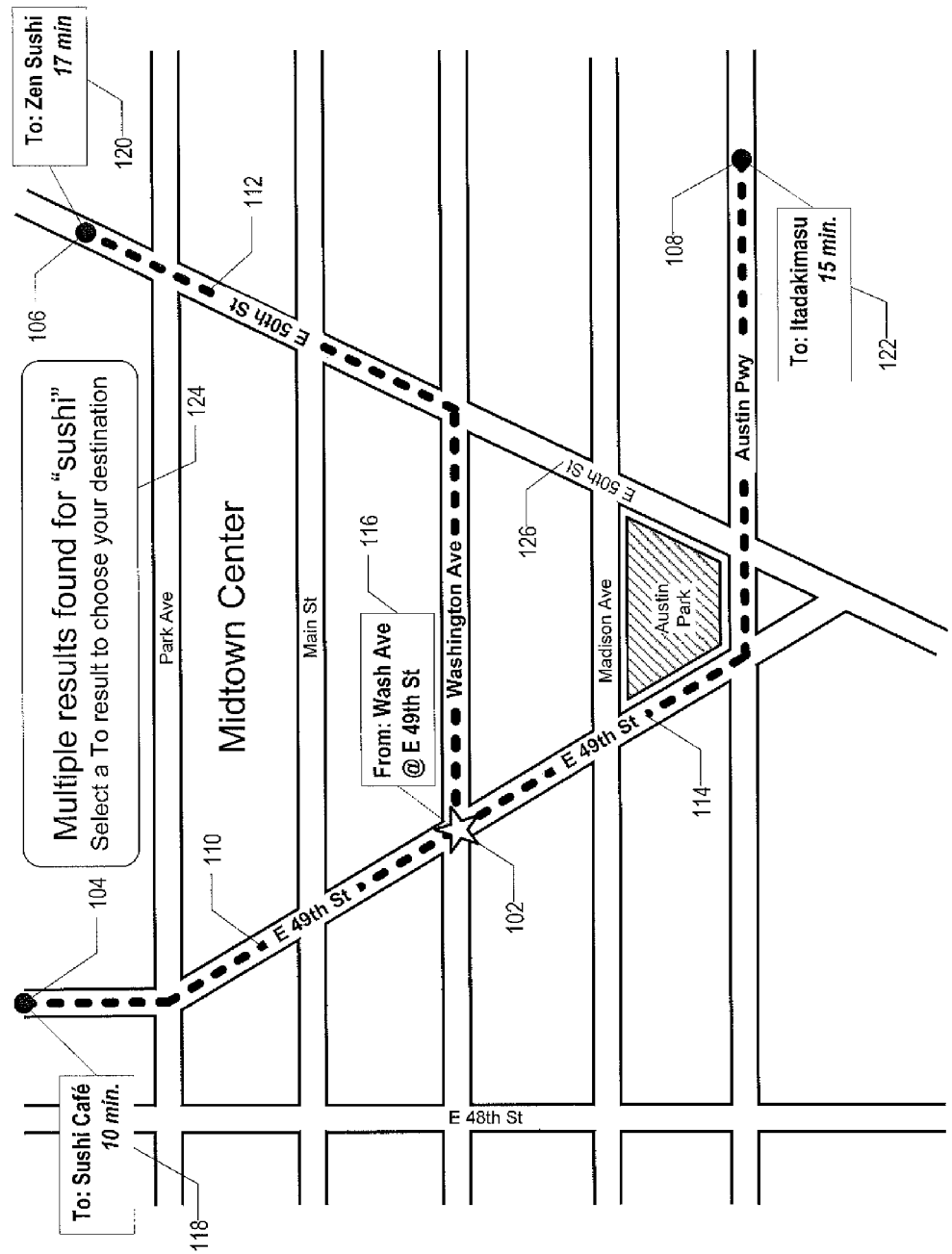
FIG. 1 shows an example route map in accordance with one or more embodiments.

While visual disambiguation for directions queries is susceptible to various modifications and alternative forms, specific embodiments thereof are shown by way of example in the drawings and will herein be described in detail. The drawings may not be to scale. It should be understood, however, that the drawings and detailed description thereto are not intended to limit visual disambiguation for directions queries to the particular form disclosed, but to the contrary, the intention is to cover all modifications, equivalents, and alternatives falling within the spirit and scope of the present disclosure as defined by the appended claims.

DETAILED DESCRIPTION

As discussed in more detail below, provided in some embodiments are systems and methods for visual disambiguation for directions queries, which may be useful for a map service, navigation service, or other applications in which turn-by-turn directions are presented or analyzed. In one embodiment, the process for visual disambiguation for directions queries includes the steps of performing a spatial search for a search term at a start location to obtain potential destinations, generating routes from the start location to each of the potential destinations, and generating a multiple route style based on the routes and a road style. In some embodiments, the routes are rendered in a route map based on the multiple route style.

A route may correspond to directions for traveling from a start location to a destination. In this case, the start location may be a current location of a user device, and the destination may be a point of interest matching a search term. Examples of points of interest are restaurants, museums, retail stores, etc. A spatial search may identify points of interest that match the search term in a geographic area (e.g., within a predetermined distance of the start location).

FIG. 1 shows an exemplary route map 100 in accordance with certain embodiments of visual disambiguation for directions queries. More specifically, FIG. 1 shows an example map 100 including routes 110, 112, and 114 from a start location 102 to destinations 104, 106, and 108. In this example, the routes 110, 112, and 114 are rendered based on a multiple route style. The multiple route style specifies that roads included in the routes 110, 112, and 114 should be rendered with dotted polylines to differentiate the routes 110, 112, and 114 from the other roads in the route map. Further, road labels for roads included in the routes 110, 112, and 114 are rendered with an emphasized font (e.g., increased font size, bolded font, etc.) whereas road labels (e.g., 126) for roads not included in the routes 110, 112, and 114 are rendered with an understated font (e.g., decreased font size, standard font, etc.).

As shown in FIG. 1, three routes (route A 110, route B 112, and route C 114) are simultaneously displayed based on the multiple route style. The start location 102 of each of the routes 110, 112, and 114 is rendered as a star with a start label 116. The start label 116 may include a description of the start location 102 such as a street address or location description. The destinations 104, 106, and 108 of each of the routes 110, 112, and 114 are rendered as circles with destination labels 118, 120, and 122 respectively. For example, each of the destinations labels 118, 120, and 122 may include a description of the corresponding destination 104, 106, and 108 such as a street address or location description. In another example, each of the destinations labels 118, 120, and 122 may include a route description of the corresponding route 110, 112, and 114 such as a travel time or a travel distance. As shown in FIG. 1, each of the destination labels 118, 120, and 122 includes a location description matching the search term "sushi" (i.e., location descriptions for sushi restaurants) and an estimated travel time.

The example route map 100 simultaneously renders routes 110, 112, and 114 with destination labels 118, 120, and 122. In this case, the example route map 100 may provide both spatial representations (e.g., routes polylines as shown in 110, 112, and 114) and route summary information (e.g., travel times or travel distances in destination labels 118, 120, and 122) to the user. Because the spatial representations and summary information is provided simultaneously, the user may efficiently select one of the routes without having to navigate through multiple screens of a map application. As shown in FIG. 1, the example route map 100 includes a user dialog 124 instructing the user to select one of the destinations 104, 106, and 108. In this example, the user may select destination 104 ("Sushi Cafe") because the destination label 118 indicates that the estimated travel time to destination 104 is ten minutes, which is less than the estimated travel times for destinations 106 and 108.

Figure 2:
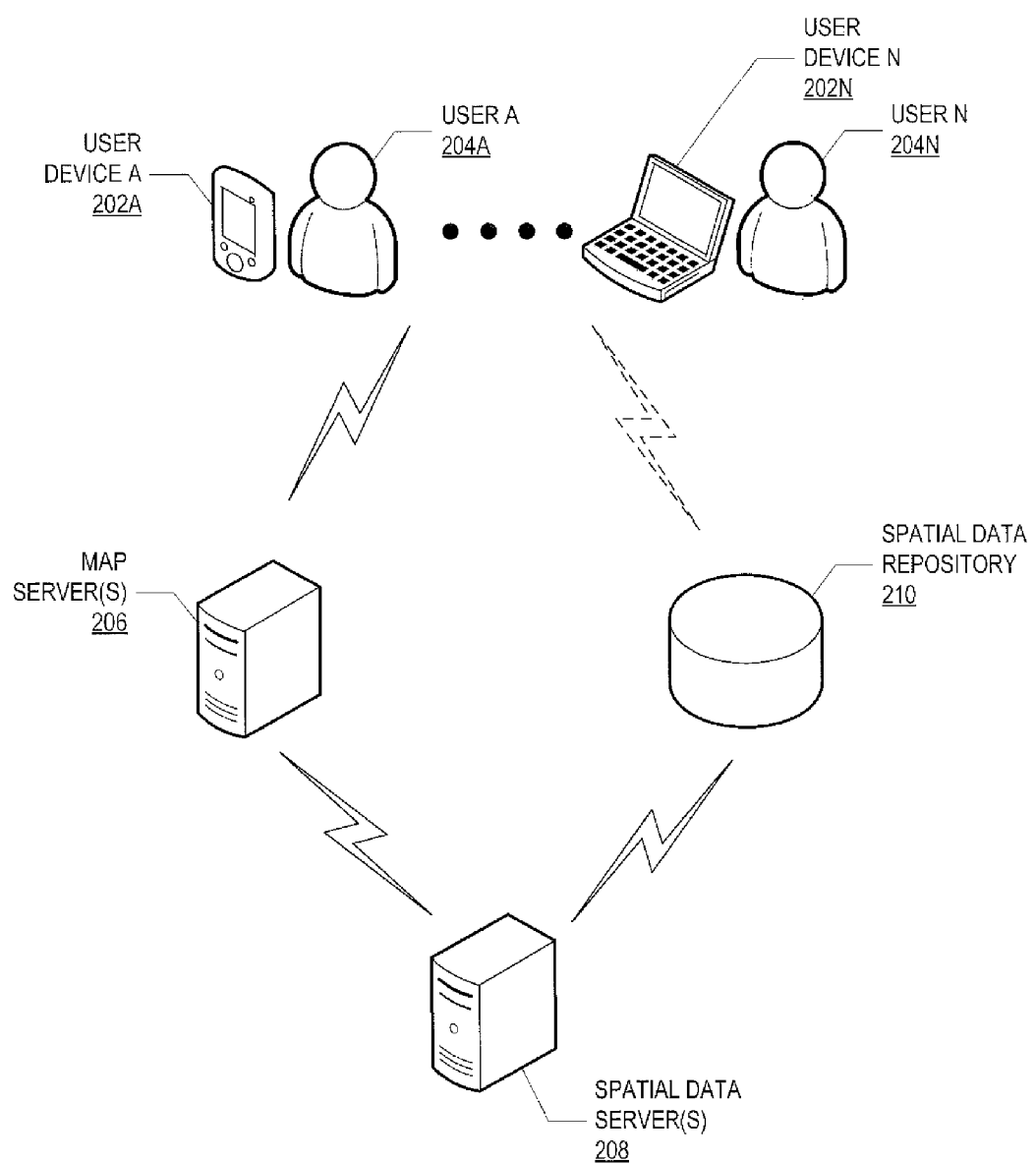

FIG. 2 shows a diagram of a system in accordance with one embodiment. The system of this embodiment includes user devices (e.g., user device A 202A and user device N 202N) interacting with map server(s) 206, which in turn interact with spatial data server(s) 208. The illustrated spatial data server 208 stores information in a spatial data repository 210. FIG. 3 describes further aspects of the aforementioned components of FIG. 2.

Examples of user devices (e.g., user device A 202A, user device N 202N) include smartphones, tablet computers, laptop computers, etc. Each of the user devices (e.g., user device A 202A, user device N 202N) may be equipped to communicate with a positioning device to determine a location of the user device. The user devices may then perform map and navigation services using the location obtained from the positioning device. As shown in FIG. 2, the user devices (e.g., user device A 202A, user device N 202N) in this example are operated by users (e.g., user A 204A, user N 204N).

Each of the map server(s) 206 may be implemented on multiple computing devices (i.e., servers), where a load balancing scheme distributes requests across the multiple computing devices. The map server 206 is configured to provide maps, geographic coordinates, directions, etc. to the user devices (e.g., user device A 202A, user device N 202N). For example, the map server 206 may provide multiple routes that are simultaneously displayed in a map on user device A 202A, where user A 204A uses the multiple routes to select a nearby point or interest. Alternatively or additionally, the map server 206 may, in some embodiments, also provide turn-by-turn directions to the selected point of interest, which are viewed by the user A 204A on the user device A 202A. The map server 206 may be configured to obtain spatial data for maps from the spatial data server(s) 208.

In some embodiments, additional repositories at the same or different location as the spatial data repository 210 may also be queried by the map service server 208 to generate routes for the user devices (e.g., user device A 202A, user device N 202N).

In some embodiments, the spatial data server 208 is configured to obtain and store spatial data in the spatial data repository 210. The stored spatial data may be later transmitted by the spatial data server 208 in response to requests from map server 206 for spatial data to be used in route maps, or the stored spatial data may be analyzed by a spatial data analysis module to generate data based on the spatial data, e.g., to generate turn-by-turn directions to navigate to a selected point of interest, to generate a multiple route style, etc. Specifically, in this embodiment, the spatial data server 208 is configured to perform spatial queries for spatial data in the spatial data repository 210 and to send the spatial data to the map server 206. The spatial data is used by the map server 206 to generate routes to be simultaneously displayed on the user devices (e.g., user device A 202A, user device N 202N) for the users (e.g., user A 204A, user N 204N).

For example, if user A 204A is traveling in Houston, Tex., the map server 206 may receive a search request including a start location and the search term "restaurant" from user device A 202A. The map server 206 may then perform a spatial search for the search term "restaurant" at the start location to obtain potential destinations near the start location from the spatial data server 208. In this case, the spatial data server 208 may obtain the potential destinations by performing a spatial query on the spatial data repository 210 for points of interest matching the search term "restaurant" within a threshold distance of the start location.

In response to receiving the potential destinations from the spatial data server 208, the map server 206 may obtain routes from the start location to each of the potential destinations. The map server 206 may also generate a multiple route style based on the routes and a road layer style. At this stage, the map server 206 prepares a route map for the user device A 202A. For example, the map server 206 may generate the route map as a map image based on the routes and a multiple route style and then send the map image to the user device A 202A (i.e., server-side map image). In another example, the map server 206 may provide the routes and the multiple route style to the user device A 202A, which dynamically generates a route map based on the routes and the multiple route style (i.e., client side dynamic map). The route map may then be used to simultaneously display the routes to the potential destinations to the user A 204A of the user device A 202A. The user A 204A may then select one of the routes to initiate turn-by-turn directions to the corresponding destination of the user device A 204A, where the current location of the user A 204A is tracked in real-time by a navigation service.

FIG. 3A shows a diagram of a system in accordance with some embodiments of visual disambiguation for directions queries. The example system includes a user device 202 communicating with (e.g., interacting, receiving broadcasts from, or transmitting broadcasts to) a map server 206, which in turn interacts with a spatial data server 208. Further, the spatial data server 208 of this embodiment stores information in a spatial data repository 210.

In some embodiments, the user device 202 is a personal computer. For example, the user device 202 may be a desktop computer, a laptop computer, a smartphone, a tablet computer, a navigation device, a wirelessly-networked imaging device, a wirelessly-networked e-reader, an on-board computer of a vehicle, or other device with a connection to a network. In some embodiments, the user device 202 includes a network interface 324 configured to send data to and receive data from the map server 206. For instance, the network interface 324 may send map requests to and receive maps from the map server 206.

In some embodiments, the user device 202 includes a processor 318, an input/output module 320, and a memory 322. The user device 202 may be implemented as a computing device with an operating system, stored in the memory 322, for interacting with a user. For example, the operating system may be configured to provide applications (e.g., a map application, a social networking application, etc.) to the user. In some embodiments, the memory 322 includes a user application 326.

In some embodiments, the user application 326 of the user device 202 is configured to provide map services to a user. For example, the user application 326 may be configured to (1) generate route maps that simultaneously display multiple routes; (2) display turn-by-turn directions for a selected route; and/or (3) transmit map requests to the map server 206. The user application 326 may include location information 366 of FIG. 3B describing the location (e.g., longitude and latitude) of the user device 202. The location information 366 of FIG. 3B may be obtained for the user device 202 from a positioning device (not shown). For example, the absolute location of the user device 202 may be determined based on GPS signals received from GPS satellites. In this example, the absolute location may be geographic coordinates identifying the location of the user device 202 in a geographic coordinate system. In another example, the relative location of the user device 202 may be determined based on mobile phone signals received from one or more mobile network towers. In this example, the relative location may specify the location of the user device 202 with reference to the mobile network towers.

Figure 3C:
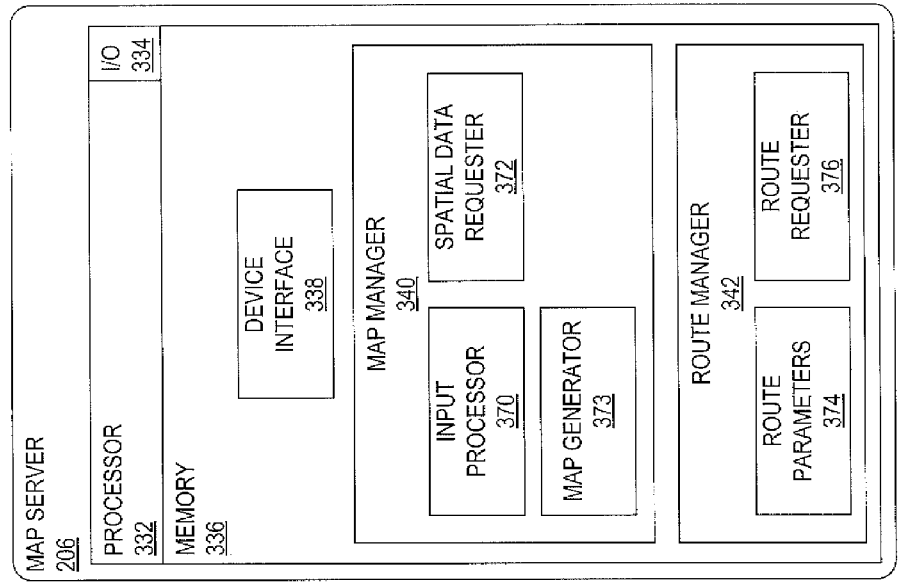
Figure 3B:
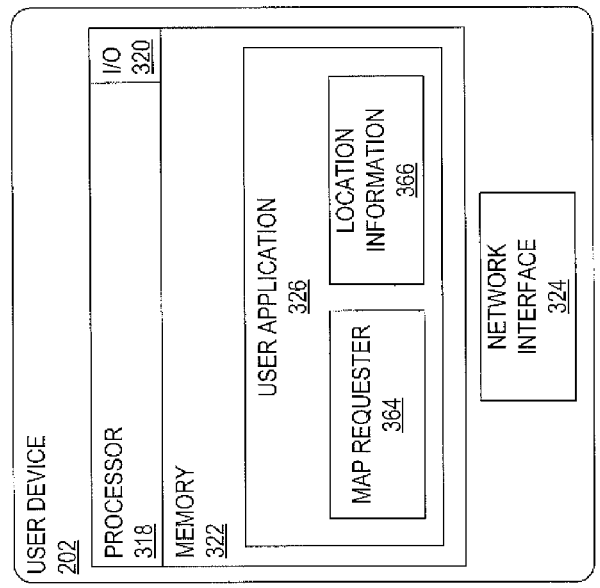

In some embodiments, the user application 326 further includes a map requester 364 of FIG. 3B configured to obtain maps from the map server 206. For example, the map requester 364 of FIG. 3B may send a map request requesting a route map based on a start location and a search term specified by the user. In this example, the map request may include user parameters such as, a start location, search term(s), routing configurations, etc. The map requester 364 of FIG. 3B may be configured to receive the requested maps from the map server 206 and to display the maps for the user.

In some embodiments, the map server 206 includes a processor 332, an input/output module 334, and memory 336. The map server 206 may include various types of computing devices that execute an operating system. The processor 332 may execute instructions, including instructions stored in the memory 336. The instructions, like the other instructions executed by computing devices herein, may be stored on a non-transitory computer readable medium such as an optical disk (e.g., compact disc, digital versatile disk, etc.), a flash drive, a hard drive, or any other computer readable storage device. The input/output module 334 of the map server 206 may include an input module, such as a radio frequency sensor, a keyboard, a touch screen, and/or a mouse, and an output module, such as a radio frequency transmitter, a printer, and/or a monitor. The map server 206 may be connected to a local area network (LAN) or a wide area network (e.g., the Internet) via a network interface connection. In some embodiments, the input/output module 334 may take other forms.

Further, the map server 206 may be implemented as a node of a distributed system, where the other portions of the distributed system are located on different nodes. The nodes of the distributed system may correspond to computing devices as discussed above. Alternatively, the nodes of the distributed system may correspond to multiple processors/cores with shared memory in a single computing device. In some embodiments, the memory 336 includes a device interface 338, a map manager 340, and a route manager 342. The aforementioned components of the map server 206 may be implemented on multiple computing devices (i.e., servers), where a load balancing scheme distributes requests across the multiple computing devices.

In some embodiments, the device interface 338 of the map server 206 is configured to process maps requests from the user device 202. The device interface 338 may be configured to extract user parameters from the map requests and to forward the extracted user parameters to the map manager 340. For example, the user parameters may include a start location and search term(s). Search terms may correspond to words, phrases, or street address information that are submitted to a search engine to search a data repository. In this example, the search terms are submitted by the user to obtain points of interest for a requested map from the spatial data repository 210. The device interface 338 may be configured to obtain requested maps from the map manager 340 for providing to the user device 202.

In some embodiments, the map manager 340 includes an input processor 370 of FIG. 3C configured to process user parameters received from the device interface 338. The input processor 370 of FIG. 3C may be configured to process the user parameters to identify spatial data (e.g., points of interest, turn-by-turn directions, etc.) for generating the requested maps. For example, the input processor 370 of FIG. 3C may identify a road layer having spatial data for building a route map based on user parameters requesting routes from a current location to points of interest matching a search term. In some embodiments, the map manager 340 includes a spatial data requester 372 of FIG. 3C configured to obtain the spatial data identified by the input processor 370 of FIG. 3C from the spatial data server 208. In another example, the input processor 370 of FIG. 3C may determine that turn-by-turn directions are requested based on the user parameters. In this example, the input processor 370 of FIG. 3C may determine route parameters (e.g., start location, end location, traveling preferences, etc.) based on the user parameters, where the route parameters 374 of FIG. 3C are provided to the route manager 342.

In some embodiments, a map layer includes spatial features (e.g., points, polylines, polygons, vectors, etc.) of a data type (e.g., points of interest, transit routes, roads, cities, rivers, state boundaries, etc.) for presenting in a map. For example, a roads map layer may include polylines for roads in a geographic area. In another example, a points of interest map layer may include points for interesting locations in a geographic area.

In some embodiments, spatial data describes the geographic location of features (e.g., points of interest, cities, geo-located images, etc.) and boundaries (e.g., rivers, county boundaries, state boundaries, country boundaries, etc.). Typically, spatial data is stored in the form of points, polylines, polygons, vectors, imagery, or some other shape. For example, geographic coordinates and associated metadata for points of interest may be stored in a point map layer. In another example, boundaries and associated metadata for geographic areas may be stored in a polygon map layer. Spatial queries may be performed between mapping layers by performing spatial comparisons (e.g., comparisons for intersections, comparisons for disjointedness, etc.) of the shapes in each of the mapping layers.

In some embodiments, the map manager 340 includes a spatial data requester 372 of FIG. 3C configured to obtain spatial data (e.g., points of interest, roads, etc.) from the spatial data server 310 based on the user parameters. For example, the spatial data requester 372 of FIG. 3C may send a spatial data request to the spatial data server 208 requesting potential destinations matching search term(s) for a geographic area. In this example, the spatial data request may specify a map scale (i.e., a ratio of map distance to corresponding actual distance on the ground) and a map extent (i.e., the outer bounds of the geographic area shown in a map) for the potential destinations. For instance, if the user parameters request a detailed map of nearby potential destinations, the spatial data request may specify a larger scale (e.g., one centimeter to 200 meters) and a map extent of a few square kilometers.

In some embodiments, the spatial data requester 372 of FIG. 3C is configured to also obtain map styles from the spatial data server 310 for rendering the spatial data. A map style may specify various rules for rendering spatial data such as label font color, label font size, label position, polyline thickness, fill color of spatial features, etc. Map styles may be defined for map layers, labels, symbols, points of interest, routes, or other map features. For instance, a multiple route style may specify that routes should be rendered (1) as thicker polylines in a different color than roads and (2) with route labels showing road names in an emphasized font. In this case, the multiple route style may also specify that a start location label should be rendered for the start location and end location labels should be rendered for each potential destination. In an exemplary embodiment, the end location labels may include the travel time or travel distance associated with the route of the corresponding destination.

In some embodiments, the map manager 340 includes a map generator 373 of FIG. 3C configured to generate maps using the spatial data obtain by the spatial data requester 372 of FIG. 3C. The map generator 373 of FIG. 3C may generate route maps for the device interface 338 to provide to the user device 202 in response to map requests. For example, the map generator 373 of FIG. 3C may consolidate the spatial data and corresponding map styles for a route map, where the spatial data and map styles are transmitted by the device interface 338 to the user device (202). In this example, the route map may be dynamically rendered by the user application 326 of the user device 202 (i.e., client side dynamic map). In another example, the map generator 373 of FIG. 3C may generate a map image based on the spatial data and corresponding map styles for a route map, where the map image is transmitted by the device interface 338 to the user device 202 (i.e., server side map image). In some embodiments, when requested by the user parameters, the map generator 373 of FIG. 3C may be configured to obtain turn-by-turn directions from the route manager 342.

In some embodiments, the route manager 342 of the map server 206 is configured to obtain routes for map requests of user devices (e.g., user device 202). Specifically, the route manager 342 may include: (1) route parameters 374 of FIG. 3C received from the input processor 370 of FIG. 3C and (2) a route requester 376 of FIG. 3C configured to obtain routes or turn-by-turn directions based on the route parameters 374 of FIG. 3C from the spatial data server 208. In some embodiments, the route parameters 374 of FIG. 3C may include a start location and potential destinations for requesting multiple routes. In this case, the route requester 376 of FIG. 3C may be configured to iteratively process the potential destinations to obtain multiple routes from the spatial data server 208.

In some embodiments, the spatial data server 208 is a computing device configured to provide spatial data to map servers (e.g., map server 206) and user devices (e.g., user device 202). In some embodiments, the spatial data server 208 includes a processor 352, an input/output module 354, and a memory 356. The spatial data server 208 may be implemented as a computing device with similar characteristics as discussed above with respect to the map server 206. In some embodiments, the memory 356 includes a map interface 360 and a spatial data manager 362. The aforementioned components of the spatial data server 208 may be implemented on multiple computing devices (i.e., servers), where a load balancing scheme distributes requests across the multiple computing devices.

In some embodiments, the map interface 360 of the spatial data server 208 is configured to process spatial data requests from the map server 206. Specifically, the map interface 360 may include a map server interface 384 of FIG. 3D configured to (1) receive spatial data requests from the map server 206 and (2) send requested spatial data to the map server 206. The map server interface 384 of FIG. 3D may forward spatial data requests received from the map server 206 to the spatial data manager 362 for processing. In some embodiments, the map interface 360 includes a map style provider 386 of FIG. 3D configured to obtain map styles for the map server 206. For example, the map style provider 386 of FIG. 3D may be configured to obtain map styles related to requested spatial data (e.g., spatial features, routes, etc.) from the spatial data repository 210. In this example, the map styles related to the requested spatial data may also be sent to the map server 206 by the map server interface 384 of FIG. 3D.

In some embodiments, the spatial data manager 362 of the spatial data server 208 is configured to manage spatial data stored in the spatial data repository 210. The spatial data manager 362 may include a spatial data interface 388 of FIG. 3D configured to access and modify data in the spatial data repository 210. For example, the spatial data interface 388 of FIG. 3D may be configured to execute database commands to retrieve or modify database records in the spatial data repository 210. In an exemplary embodiment, the spatial data interface 388 of FIG. 3D may be used by the other modules (e.g., spatial operator 390, spatial comparer 392, spatial query builder 394, spatial routing engine 396) of the spatial data manager 362 to perform spatial or data operations.

Figure 3D:
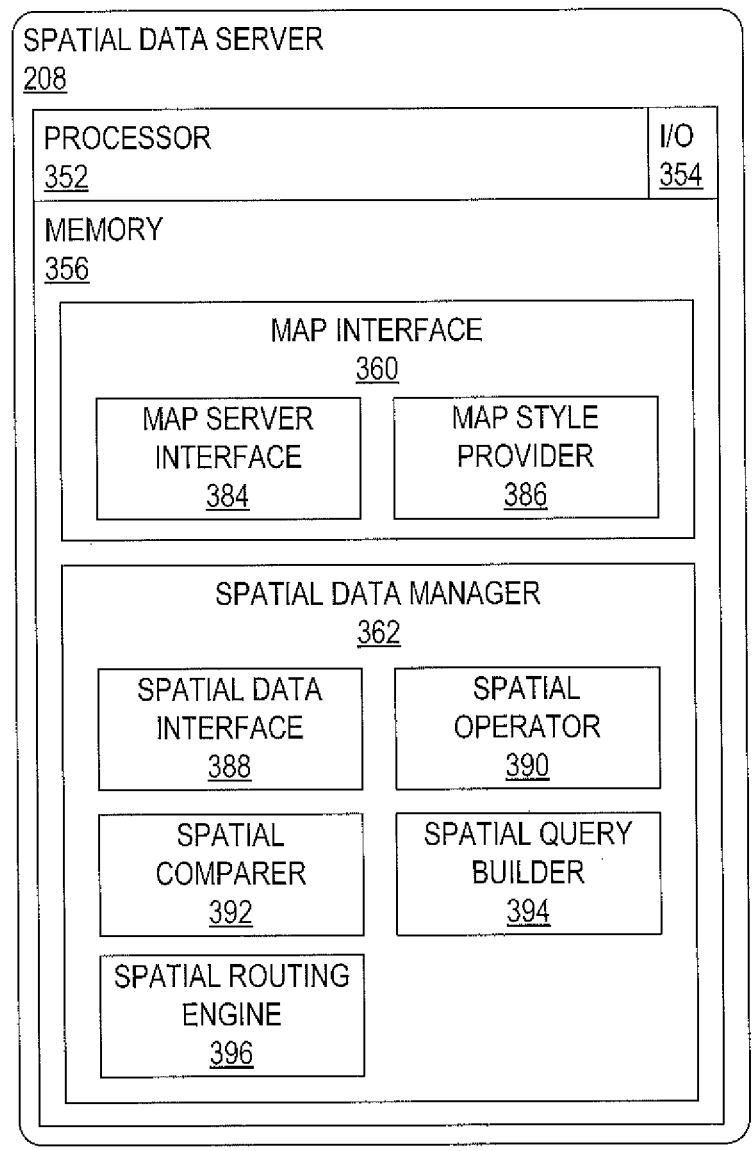

In some embodiments, the spatial data manager 362 may include a spatial operator 390 of FIG. 3D configured to perform spatial operations on spatial data. Examples of spatial operations may include intersecting spatial features, snapping one spatial feature to another, unioning spatial features, buffering a spatial feature, and differencing spatial features. The spatial operator 390 of FIG. 3D may perform the spatial operations on spatial data retrieved from the spatial data repository 210 by the spatial data interface 388 of FIG. 3D. In this case, the results of the spatial operation may be stored in the spatial data repository 210 by the spatial data interface 388 of FIG. 3D.

In some embodiments, the spatial data manager 362 may include a spatial comparer 392 of FIG. 3D configured to perform spatial comparisons of spatial data. Examples of spatial comparisons may include determining whether spatial features intersect, determining whether a spatial feature is contained by another spatial feature, determining whether a spatial feature contains another spatial feature, determining whether spatial features are disjoint, determining whether a spatial feature is equal to another spatial feature, and determining whether a spatial feature touches another spatial feature. The spatial comparer 392 of FIG. 3D may perform the spatial comparisons on spatial data retrieved from the spatial data repository 210 by the spatial data interface 388 of FIG. 3D.

In some embodiments, the spatial data manager 362 may include a spatial query builder 394 of FIG. 3D configured to generate database commands for retrieving or modifying spatial data in the spatial data repository 210. For instance, the spatial query builder 394 of FIG. 3D may build structured query language (SQL) statements for retrieving or modifying spatial data. In this case, the spatial data interface 388 of FIG. 3D may be configured to execute the SQL statements to retrieve or modify spatial data in the spatial data repository 210. In some embodiments, the spatial query builder 394 of FIG. 3D may be configured to generate a spatial query to obtain points of interest (i.e., potential destinations) related to search term(s) that are within a threshold distance of a start location.

In some embodiments, the spatial data manager 362 may include a spatial routing engine 396 of FIG. 3D configured to determine routes based on route parameters. For instance, the spatial routing engine 396 of FIG. 3D may be configured to determine routes between a start location and potential destinations. In this case, each route may be determined using a routing algorithm having various configurations (e.g., shortest route, fastest route, avoiding highways, avoiding tollways, use public transportation) that are specified in the routing parameters. In an exemplary embodiment, the spatial routing engine 396 of FIG. 3D may determine a route represented by a polyline and associated route information (e.g., distance, travel time, turn-by-turn directions, etc.) based on spatial data from a road layer that is stored in the spatial data repository 210. The route polyline may have a number of route segments, where the route information is also determined per segment (e.g., segment distance, segment travel time, etc.).

In some embodiments, the spatial data repository 210 is configured to store spatial data and map styles for use by a map service. The stored spatial data may include spatial features (e.g., geographic coordinates, lines, polylines, polygons, etc.) and associated metadata (e.g., road names, county names, point of interest descriptions, etc.). The spatial data repository 210 may correspond to a server, a database, files, a memory cache, etc. that is stored locally (e.g., located on the spatial data server) or shared on a network (e.g., a database server). The user device 202 may interact directly with the spatial data repository 210 to obtain spatial data to, for example, obtain real-time updates for a client side dynamic map. In some embodiments, the metadata associated with the spatial features may be stored in a separate repository (not shown). For example, the spatial data repository 210 and the separate repository may be organized in a distributed relational database architecture.

In some embodiments, the spatial data repository 210, or a related repository, is configured to store information related to the spatial data. For example, the spatial data repository 210 may also store results of analysis (e.g., turn-by-turn directions, etc.) performed on the spatial data.

Figure 4:
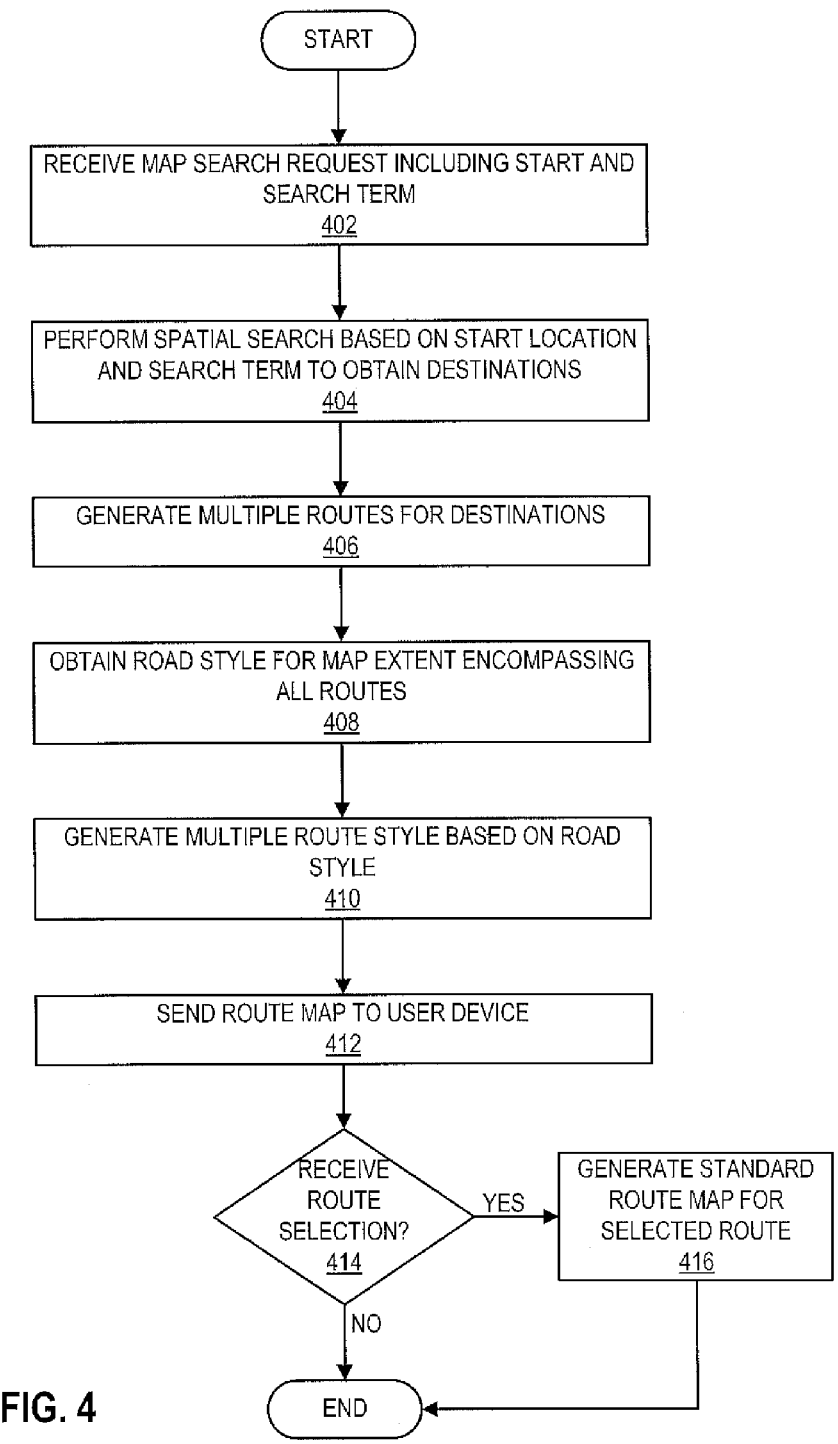
FIGS. 4-5 show flow charts in accordance with one or more embodiments.

FIG. 4 shows a flow chart in accordance with certain embodiments. More specifically, FIG. 4 is a flow chart of a method performed by a map server for obtaining routes. The routes may be obtained for a map service or for other purposes. As is the case with the other processes described herein, various embodiments may not include all of the steps described below, may include additional steps, and may sequence the steps differently. Accordingly, the specific arrangement of steps shown in FIG. 4 should not be construed as limiting the scope of visual disambiguation for directions queries.

In step 402 of this embodiment, a map search request including a start location and search term(s) is received. For example, the start location may correspond to a current location of a user device, and the search term(s) may refer to words (e.g., "burger," "sushi," "gas," etc.) or to a location category (e.g., restaurant, retail store, bank, etc.) entered by a user searching for a point of interest. In another example, the search term(s) may refer to street address information such as a house number, a street, a city, a state, a zip code, etc. In yet another example, the search term(s) may be some other suitable combination of words, location categories, and street address information. The current location of the user device may be determined by a positioning device such as a global positioning system (GPS).

In step 404 of this embodiment, a spatial search is performed based on the start location and the search term(s) to obtain potential destinations. More specifically, a spatial query may be performed to obtain potential destinations related to the search term(s) that are within a threshold distance of the start location. For example, a potential destination may be related to the search term(s) if one or more words in the search term(s) match words or phrases in a description of the potential destination. In another example, a potential destination may be related to the search term(s) if a category (e.g., restaurant, store, bank, park, etc.) of the potential destination matches one or more words in the search term(s). In yet another example, a potential destination may be related to the search term(s) if the potential destination matches street address information in the search term(s).

In step 406 of this embodiment, routes are generated for the potential destinations. Specifically, a route from the start location to each of the potential destinations may be determined using a routing algorithm having various configurations (e.g., shortest route, fastest route, avoiding highways, avoiding tollways, use public transportation) that are specified as routing parameters in the map search request. For example, if the routing parameters request driving directions, the routing algorithm may determine a polyline route from the start location to each potential destination based on road features that are obtained from a spatial data repository. In another example, if the routing parameters request public transit directions, the routing algorithm may determine a polyline route from the start location to each potential destination based on transit route features that are obtained from a spatial data repository.

In step 408 of this embodiment, a road style for a map extent encompassing the routes is obtained. The map extent may correspond to the outer bounds of the geographic area shown in a map. For example, the map extent may be obtained for the routes by determining outer bounds that encompass the routes. In this example, the map extent may also include a buffer area surrounding the routes. In some embodiments, the road style obtained may be based on the scale of the map. For example, a large scale map (i.e., showing greater detail) may use a detailed road style specifying that roads should be rendered as thicker polylines with road labels for all roads. In another example, a small scale map (i.e., showing less detail) may use a regional road style specifying that roads should be rendered as thinner polylines with road labels only for major roads such as highways.

In step 410 of this embodiment, a multiple route style is generated based on the road style. For example, the multiple route style may specify that (1) the route polylines should be rendered with a greater thickness than road polylines; (2) road labels for roads that intersect routes should be rendered with an emphasized font, (3) a start location label and destination labels should not intersect road labels when rendered; and/or (4) each destination label should include route information (e.g., travel time, travel distance) for a corresponding route. In this example, the routes are rendered based on the multiple route style such that the routes are easily differentiated from roads that are not included in the routes (non-route roads). In some embodiments, the road style may be modified to further de-emphasize roads that are not included in the routes. For example, the modified road style may specify that (1) road labels for non-route roads should be rendered in an understated font and/or (2) road labels for non-route roads that cannot be repositioned to satisfy the multiple route style should not be rendered.

In step 412 of this embodiment, a route map having the multiple routes is sent to the user device. For example, the route map may be generated as a map image based on the multiple routes and the multiple route style and then sent to the user device (i.e., server-side map image). In another example, the multiple routes and the multiple route style may be provided to the user device, which dynamically generates the route map based on the multiple routes and the multiple route style (i.e., client side dynamic map). In either case, the route map may be displayed on the user device, where the user may select one of the multiple routes to request turn-by-turn directions to the corresponding destination.

In step 414 of this embodiment, a determination is made as to whether a route selection is received. For example, the user may select one of the multiple routes displayed on the user device. In this example, a map request requesting a standard route map for the selected route may be received from the user device. The map request for the standard route map may include the start location and a selected destination associated with the selected route.

If a selected route is received from the user device, the standard route map is generated for the selected route in step 416. The standard route map may be generated based on the start location and the selected destination and then sent to the user device, which may provide turn-by-turn directions for navigating to the selected destination based on the standard route map.

If a selected route is not received from the user device in step 414, the process ends.

Figure 5:
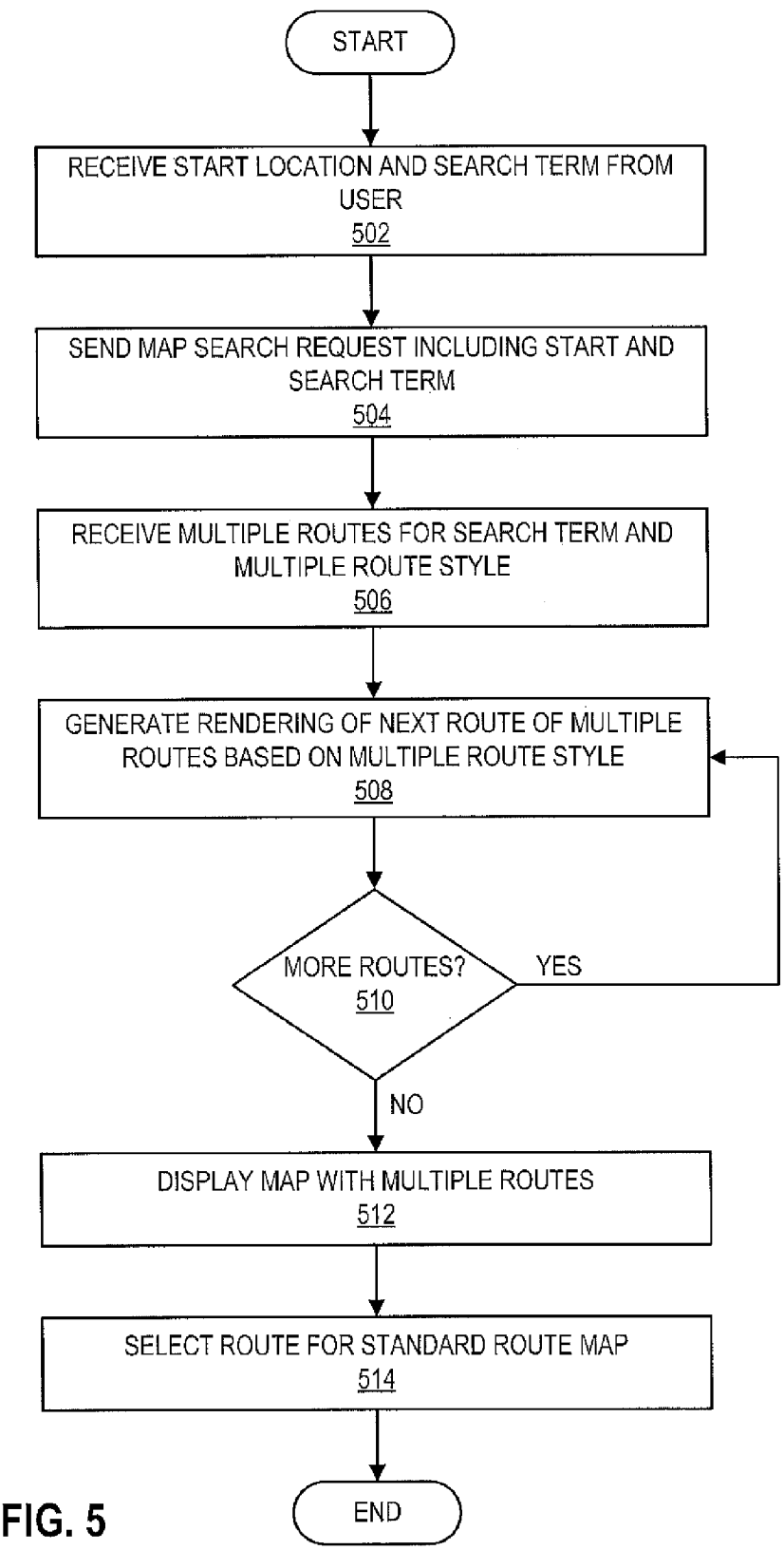

FIG. 5 shows a flow chart in accordance with certain embodiments. More specifically, FIG. 5 is a flow chart of a method performed by a user device for obtaining routes. The routes may be obtained for a map service or for other purposes. As is the case with the other processes described herein, various embodiments may not include all of the steps described below, may include additional steps, and may sequence the steps differently. Accordingly, the specific arrangement of steps shown in FIG. 5 should not be construed as limiting the scope of visual disambiguation for directions queries.

In step 502 of this embodiment, a start location and search term are received from the user. For example, the user may submit the start location and the search term using a map application of the user device. The start location may be a current location of the user device determined using a positioning device such as GPS. In this example, the user may enter a specific search term (e.g., search words or street address information) in the map application using a input module of the user device such as a keyboard, a touch screen, and/or a mouse. In this example, the street address information may be used to geocode (i.e., convert a street address into a geographic coordinate based on road features) a potential destination. In another example, the user may select a category (e.g., restaurant, retail store, gas station, etc.) in the map application to specify the search term.

In step 504 of this embodiment, a map request including the start location and the search term is sent to a map server. The map-request may also include other routing parameters such as various configurations (e.g., shortest route, fastest route, avoiding highways, avoiding tollways, use public transportation) for a routing algorithm.

In step 506 of this embodiment, multiple routes for the search term and a multiple route style are received from the map server. The multiple routes may include multiple route polylines and associated route information (e.g., travel time of each route, travel distance of each route, etc.). The multiple route style may specify how the multiple routes should be rendered in a route map. For example, the multiple route style may specify (1) the thickness and color for rendering route polylines and (2) content and position for rendering road labels of roads included in the multiple routes.

Alternatively, rather than receiving the multiple route style from the map server, the multiple route style may be generated locally by the user device. For example, the user device may be configured with a default multiple route style for generating route maps. In another example, the user device may generate the multiple route style based on the multiple routes and a road style as discussed above with respect to FIG. 4.

In step 508 of this embodiment, a rendering is generated for the next route of the multiple routes based on the multiple route style. For instance, the next route may be rendered as a route polyline having the thickness and color specified in the multiple route style, and road labels for roads included in the next route may be rendered with the content and position specified in the multiple route style. Further, the multiple route style may specify that (1) a start location label including a description of the start location should be rendered and (2) an end location label including a description for the destination should be rendered for the next route. In step 510 of this embodiment, a determination is made as to whether there are more routes to process. If there are more routes to process, the process returns to step 508 to process the next route of the multiple routes.

In some embodiments, conformity with the multiple route style is verified as each of the multiple routes is processed. Existing road labels may need to be shifted to confirm to the multiple route style as additional road labels are rendered for the next route. For example, road labels for roads included in the multiple routes may be preferred over non-route road labels for non-route roads (i.e., roads that are not included in the multiple routes). If a non-route road label cannot be shifted to conform to the multiple route style, the non-route road label may not be rendered.

If it is determined that there are no more routes to process, the route map is displayed with the renderings of the multiple routes in step 512. For example, the multiple routes are simultaneously rendered in the route map based on the multiple route style as described above.

In step 514 of this embodiment, the user selects one of the multiple routes to request a standard route map. The standard route map may display turn-by-turn directions for the selected route. For example, if the user searched for a "restaurant" in step 502 above, the user may now select one of multiple restaurants to initiate a navigation service for the selected restaurant.

Figure 6:
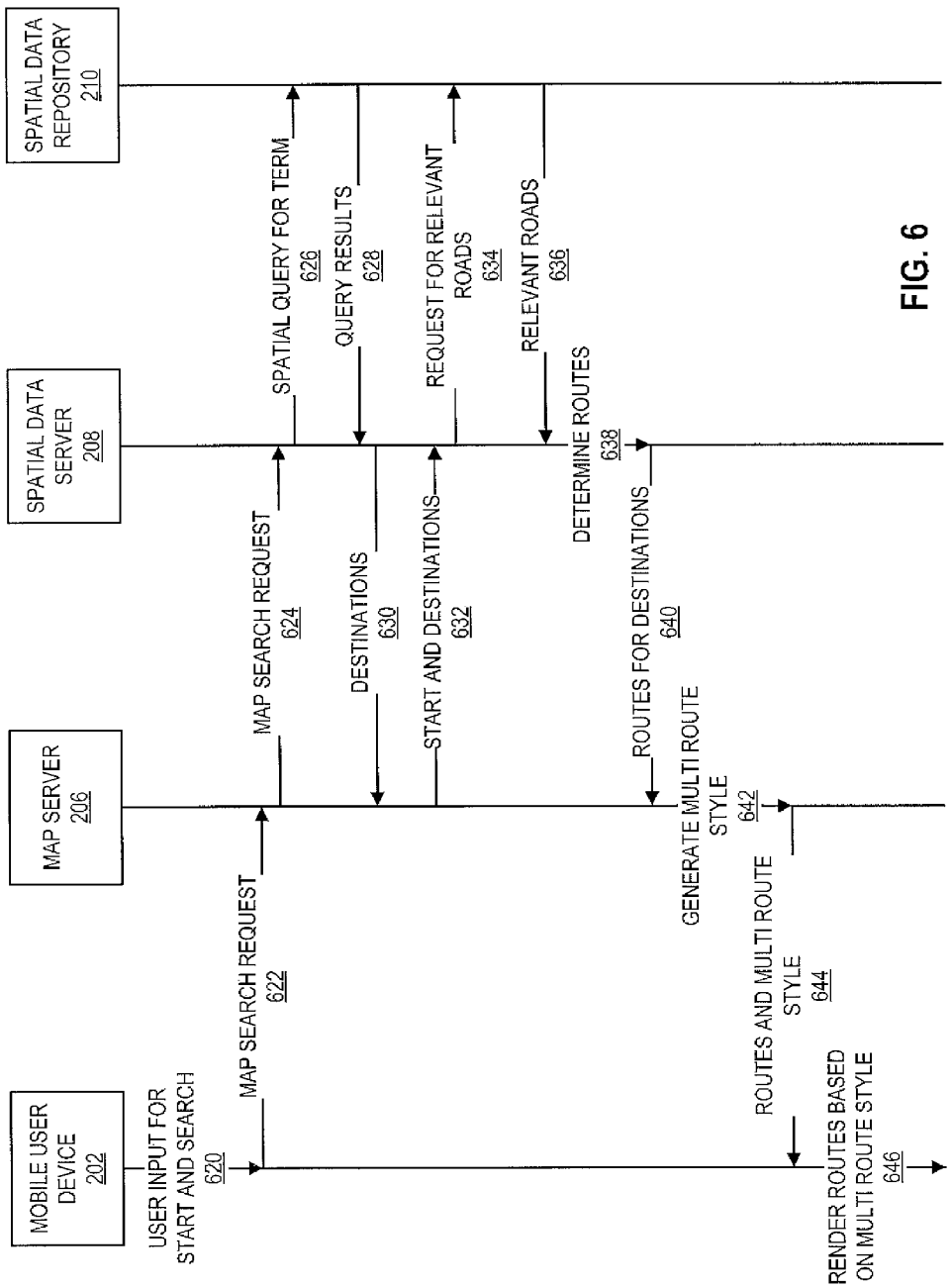
FIG. 6 shows an example data flow in accordance with one or more embodiments.

FIG. 6 shows an example data flow in accordance with embodiments of visual disambiguation for directions queries. More specifically, FIG. 6 shows an example of obtaining multiple routes for a search term from a map server 206. The example includes a mobile user device 202, a map server 206, a spatial data server 208, and a spatial data repository 210, which may be substantially similar to their corresponding components discussed above with respect to FIGS. 2 and 3A-3D.

In step 620 of the present embodiment, the mobile user device 202 obtains user input including a start location and a search term. For example, the start location may be a current location of the mobile user device 202 determined based on a signal received from a positioning device (not shown). In this example, the search term may be entered by a user of the mobile user device 202 via a user application such as a map application.

In step 622 of the present embodiment, a map search request comprising the start location and the search term is sent from the mobile user device 202 to the map server 206. The map server 206 processes the map search request and forwards the map search request to the spatial data server 208 in step 624. In step 626 of the present embodiment, the spatial data server 208 performs a spatial query for points of interest related to the search term within a threshold distance of the start location from the spatial data repository 210. The results of the spatial query are returned to the spatial data server 208 in step 628.

In step 630 of the present embodiment, the spatial data server 208 sends the results of the spatial query to the map server 206. Specifically, the map server 206 may receive the results as potential destinations for a user of the mobile user device 202. In step 632 of the present embodiment, the start location and destinations are sent by the map server 206 to the spatial data server 208. In this example, the map server 206 is requesting routes from the start location to each of the destinations from the spatial data server 208.

In step 634 of the present embodiment, the spatial data server 208 requests the roads that are relevant to the start location and destinations from the spatial data repository 210. Specifically, the spatial data server 208 requests relevant roads within a map extent that encompasses the start location and the destinations. In step 636 of the present embodiment, the spatial data repository 210 sends the relevant roads to the spatial data server 208.

In step 638 of the present embodiment, the spatial data server 208 generates a route from the start location to each of the destinations based on the relevant roads. For example, the spatial data server 208 may apply a routing algorithm to the relevant roads to determine a route from the start location to each of the destinations. In step 640 of the present embodiment, the multiple routes determined by the spatial data server 208 are sent to the map server 206. Further, the spatial data server 208 may also send the relevant roads and a road style to the map server 206.

In step 642 of the present embodiment, the map server 206 generates a multiple route style based on the routes and the road style. The multiple route style may be used to render the multiple routes such that (1) sufficient route information is provided for each route to allow the user of the mobile user device 202 to make an informed selection and (2) the rendered routes are easily distinguishable from rendered roads that do not overlap the routes. In step 644 of the present embodiment, the map server 206 sends the multiple routes and the multiple route style to the mobile user device 202. Further, the map server 206 may also send the relevant roads and the road style to the mobile user device 202.

In step 646 of the present embodiment, the mobile user device 202 renders a route map such that the multiple routes are simultaneously displayed based on the multiple route style. For example, the route map may be rendered as discussed below with respect to FIG. 1. Because the route map simultaneously displays the multiple routes, the user of the user mobile device 202 is allowed to select one of the routes based on the spatial representations of the routes.

While visual disambiguation for directions queries has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present embodiments may suitably comprise, consist or consist essentially of the elements disclosed and may be practiced in the absence of an element not disclosed.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

I claim:

1. A method of visual disambiguation for directions queries, the method comprising:
obtaining user parameters comprising a start location and a search term;
sending by a one or more processors a map search request comprising the start location and the search term to a map server, the start location and the search term being used by the map server to:
identify a plurality of potential destinations that are each within a threshold distance of the start location and associated with the search term; and
generate a plurality of routes, each of the plurality of routes describing a route from the start location to one of a plurality of potential destinations associated with the search term;
receiving by the one or more processors the plurality of routes in response to the map search request;
receiving by the one or more processors a road style for rendering roads in a map extent encompassing the plurality of routes; and
simultaneously displaying by the one or more processors the plurality of routes on a single route map from the start location to each of the plurality of potential destinations associated with the search term based on a multiple route style that comprises the road style such that the user can select one of the plurality of routes from the simultaneous display;

simultaneously displaying by the one or more processors a plurality of end location labels on the single route map with the plurality of routes, each end location label comprising a description of the corresponding potential destination and one or more of a travel time or travel distance for the corresponding route from the start location to that potential destination; and receiving by the one or more processors user selection of one of the plurality of routes based on the simultaneous display of the plurality of routes and the plurality of end location labels, wherein the user selection of one of the plurality of routes is selected from the single route map without having to navigate through multiple screens.

2. The method of claim 1, wherein the simultaneous display of the plurality of routes comprises a start location label for the start location and an end location label for each of the plurality of potential destinations.

3. The method of claim 2, wherein the end location label for each of the plurality of potential destinations is rendered such that the end location label does not intersect road labels rendered based on the road style.

4. The method of claim 3, wherein the end location label is favored over the road labels such that intersecting road labels that cannot be repositioned to satisfy the multiple route style are not rendered.

5. The method of claim 1, wherein the plurality of routes intersect one or more route roads, wherein the one or more route roads are rendered with an emphasized font based on the multiple route style, and wherein other roads are rendered with an understated font based on the road style.

6. The method of claim 1, wherein the multiple route style is generated based on the plurality of routes and the road style.

7. A method of visual disambiguation for directions queries, the method comprising:

receiving a map search request comprising a start location and a search term;

performing by one or more processors a spatial search to identify a plurality of potential destinations that are each within a threshold distance of the start location and associated with the search term;

generating by the one or more processors a plurality of routes, each of the plurality of routes describing a route from the start location to one of the plurality of potential destinations;

obtaining a road style for rendering roads in a map extent that encompasses the plurality of routes;

sending the plurality of routes and the road style to a user device, the user device simultaneously displaying on a single route map the plurality of routes from the start location to each of the plurality of potential destinations associated with the search term based on a multiple route style that comprises the road style such that the user can select one of the plurality of potential routes from the simultaneous display;

generating by the one or more processors a plurality of end location labels, each end location label comprising a description of the corresponding potential destination and one or more of a travel time or travel distance for the corresponding route from the start location to that potential destination;

sending the plurality of end location labels to a user device, the user device simultaneously displaying the plurality of end location labels on the single route map with the plurality of routes; and receiving at the user device a user selection of one of the plurality of routes based on the simultaneous display of the plurality of routes and the plurality of end location labels, wherein the user selection of one of the plurality of routes is selected from the single route map without having to navigate through multiple screens.

8. The method of claim 7, wherein each of the plurality of routes comprises a travel time for the route from the start location to one of the plurality of potential destinations, wherein the travel time for each of the plurality of routes is rendered as a travel time label based on the multiple route style.

9. The method of claim 7, wherein the start location has a start description that is rendered as a start location label and each of the plurality of potential destination has an end description that is rendered as an end location label based on the multiple route style.

10. The method of claim 8, further comprising rendering road labels based on the road style, wherein the multiple route style specifies that the end location label for each of the plurality of potential destinations cannot intersect the road labels.

11. The method of claim 10, wherein the end location label is favored over the road labels such that intersecting road labels that cannot be repositioned to satisfy the multiple route style are not rendered.

12. The method of claim 7, wherein the plurality of routes intersect one or more route roads, wherein the one or more route roads are rendered with an emphasized font based on the multiple route style, and wherein other roads are rendered with an understated font based on the road style.

13. The method of claim 7, further comprising:

receiving a user selection of a selected route of the plurality of routes; and generating a route map for the selected route, the route map being displayed in a navigation display of the user device.

14. A system, comprising:

a plurality of memories;

a plurality of processors, each operatively connected to at least one of the plurality of memories;

a user device interface stored on the plurality of memories, the user device interface being executed by the plurality of processors to:

receive a map search request comprising a start location and a search term from a user device;

send a plurality of routes and a road style to the user device, the user device simultaneously displaying on a single route map the plurality of routes from the start location to each of the plurality of potential destinations associated with the search term based on a multiple route style that comprises the road style such that the user can select one of the plurality of potential routes from the simultaneous display;

send a plurality of end location labels to the user device, the user device simultaneously displaying the plurality of end location labels on the single route map with the plurality of routes; and receive at the user device a user selection of one of the plurality of routes based on the simultaneous display of the plurality of routes and the plurality of end location labels, wherein the user selection of one of the plurality of routes is selected from the single route map without having to navigate through multiple screens;

a mapping module stored on the plurality of memories, the mapping module being executed by the plurality of processors to:

perform a spatial search to identify a plurality of potential destinations that are each within a threshold distance of the start location and associated with the search term;
generate the plurality of routes, each of the plurality of routes describing a route from the start location to one of the plurality of potential destinations;
generate a plurality of end location labels, each end location label comprising a description of the corresponding potential destination and one or more of a travel time or travel distance for the corresponding route from the start location to that potential destination; and
obtain the road style for rendering roads in a map extent that encompasses the plurality of routes.

15. The system of claim 14, the mapping module being further executed by the plurality of processors to:
determine a travel time of each of the plurality of routes, wherein the travel time for each of the plurality of routes is rendered as a travel time label based on the multiple route style.

16. The system of claim 14, wherein the start location has a start description that is rendered as a start location label and each of the plurality of potential destination has an end description that is rendered as an end location label based on the multiple route style.

17. The system of claim 16, wherein the multiple route style specifies that the end location label for each of the plurality of potential destinations cannot intersect road labels that are rendered based on the road style.

18. The system of claim 17, wherein the end location label is favored over the road labels such that intersecting road labels that cannot be repositioned to satisfy the multiple route style are not rendered.

19. The system of claim 14, wherein the route of the plurality of routes intersect one or more route roads, wherein the one or more route roads are rendered with an emphasized font based on the multiple route style, and wherein other roads are rendered with an understated font based on the road style.

20. The system of claim 14, further comprising the user device to:
send the map search request to the user device interface;
obtain the plurality of routes and the multiple route style from the user device interface; and
simultaneously display the plurality of routes based on the multiple route style.

21. A non-transitory computer readable medium having computer-executable program instructions embodied therein that when executed cause a plurality of processors to:
receive a map search request comprising a start location and a search term;
perform a spatial search to identify a plurality of potential destinations that are each within a threshold distance of the start location and associated with the search term;
generate a plurality of routes, each of the plurality of routes describing a route from the start location to one of the plurality of potential destinations;
obtain a road style for rendering roads in a map extent that encompasses the plurality of routes;
send the plurality of routes and the road style to a user device, the user device simultaneously displaying on a single route map the plurality of routes from the start location to each of the plurality of potential destinations associated with the search term based on a multiple route style that comprises the road style such that the user can select one of the plurality of potential routes from the simultaneous display;
generate a plurality of end location labels, each end location label comprising a description of the corresponding potential destination and one or more of a travel time or travel distance for the corresponding route from the start location to that potential destination;
send the plurality of end location labels to the user device, the user device simultaneously displaying the plurality of end location labels on the single route map with the plurality of routes; and
receive at the user device a user selection of one of the plurality of routes based on the simultaneous display of the plurality of routes and the plurality of end location labels, wherein the user selection of one of the plurality of routes is selected from the single route map without having to navigate through multiple screens.

22. The computer readable medium of claim 21, the computer-executable program instructions further causing the plurality of processors to:
determine a travel time for each of the plurality of routes, wherein the travel time for each of the plurality of routes is rendered as a travel time label based on the multiple route style.

23. The computer readable medium of claim 21, wherein the start location has a start description that is rendered as a start location label and each of the plurality of potential destination has an end description that is rendered as an end location label based on the multiple route style.

24. The computer readable medium of claim 23, wherein the multiple route style specifies that the end location label for each of the plurality of potential destinations cannot intersect road labels that are rendered based on the road style.

25. The computer readable medium of claim 24, wherein the end location label is favored over the road labels such that intersecting road labels that cannot be repositioned to satisfy the multiple route style are not rendered.

26. The computer readable medium of claim 21, wherein the plurality of routes intersect one or more route roads, wherein the one or more route roads are rendered with an emphasized font based on the multiple route style, and wherein other roads are rendered with an understated font based on the road style.

27. The computer readable medium of claim 21, the computer-executable program instructions further causing the plurality of processors to:
receive a user selection of a selected route of the plurality of routes; and
generate a route map for the selected route, the route map being displayed in a navigation display of the user device.

* * * * *